(12) United States Patent
Tripathi et al.

(10) Patent No.: US 6,577,512 B2
(45) Date of Patent: Jun. 10, 2003

(54) POWER SUPPLY FOR LEDS

(75) Inventors: Ajay Tripathi, Schaumburg, IL (US);
Bernd Clauberg, Schaumburg, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/865,895

(22) Filed: May 25, 2001

(65) Prior Publication Data

US 2002/0176262 A1 Nov. 28, 2002

(51) Int. Cl.[7] .............................................. H02M 3/335
(52) U.S. Cl. ................................. 363/21.17; 363/21.15
(58) Field of Search .......................... 363/16, 20, 21.01, 363/21.12, 21.15, 21.17, 95, 97, 131; 315/291, 225, 307, 354

(56) References Cited

U.S. PATENT DOCUMENTS

| 5,414,611 A | * | 5/1995 | Muto et al. ................... 363/20 |
| 6,040,663 A | * | 3/2000 | Bucks et al. ................ 315/291 |
| 6,091,614 A1 | | 7/2002 | Malenfant .................... 363/97 |

FOREIGN PATENT DOCUMENTS

WO  WO0105193  1/2001  ........... H05B/33/08

\* cited by examiner

*Primary Examiner*—Matthew Nguyen

(57) ABSTRACT

The power supply for LEDs of the present invention provides power to a variable number of LEDs wired in series or in parallel. The power supply uses current feedback to adjust power to the LEDs and provides protection against open circuits and circuit malfunctions. A current controller compares sensed current to a reference current and generates a feedback signal, which is processed by a power factor corrector to adjust the current flow through the transformer supplying current to the LEDs.

41 Claims, 2 Drawing Sheets

POWER SUPPLY FOR LEDS

TECHNICAL FIELD

The technical field of this disclosure is power supplies, particularly, a power supply for LEDs.

BACKGROUND OF THE INVENTION

Significant advances have been made in the technology of white light emitting diodes (LEDs). White light LEDs are commercially available which generate 10–15 lumens/watt. This is comparable to the performance of incandescent bulbs. In addition, LEDs offer other advantages such as longer operating life, shock/vibration resistance and design flexibility because of their small size. As a result, white light LEDs are replacing traditional incandescent sources for illumination applications such as signage, accenting, and pathway lighting. The white LEDs can be used alone or in conjunction with colored LEDs for a particular effect.

The existing power supplies for white light LED systems consists of a line frequency transformer for isolation and voltage matching, which feeds a rectifier/filter and a current limiting resistor, as shown in FIG. 1. The rectifier/filter converts the stepped down line ac voltage into dc voltage. The current limiting resistor regulates the LED current against variations in line voltage. The use of line frequency transformer makes the power supply bulky. The current limiting resistor causes power loss, making the power supplies inefficient. In addition, current regulation is not precise and differs for different LED string lengths (LEDs connected in series). The efficiency and current regulation could be optimized for a fixed number of LEDs in a particular light source, but then the power supply would only be suitable for that particular light source. Therefore, currently available power supplies are not capable of driving light sources with different number of LEDs (for example, one or more in a series string) with good regulation and efficiency.

The electrical characteristics of LEDs are such that small changes in the voltage applied to the LED lamp will cause appreciable current changes. In addition, ambient temperature changes will also result in LED current changes by changing the forward drop across the LEDs. Furthermore, the lumen output of LEDs depends on the LED current. The existing electrical power supplies for LED light sources are not designed to precisely regulate the LED current to prevent luminous intensity variations due to input ac voltage variations and ambient temperature. Operation of LED lamps at excessive forward current for a long period can cause unacceptable luminous intensity variations and even catastrophic failure. In addition, current electrical power supplies do not minimize power consumption to maximize energy savings.

It would be desirable to have a power supply for LEDs that would overcome the above disadvantages.

SUMMARY OF THE INVENTION

One aspect of the present invention provides a power supply for an LED light source with good regulation and efficiency.

Another aspect of the present invention provides a power supply for an LED light source able to drive variable numbers of LEDs.

Another aspect of the present invention provides a power supply for an LED light source able to accommodate the new generation of high power LEDs.

Another aspect of the present invention provides a power supply for an LED light source of small size and low weight.

Another aspect of the present invention provides a power supply for an LED light source protecting against open circuits and circuit malfunctions.

Another aspect of the present invention provides a power supply for an LED light source avoiding operation of LED lamps at excessive forward current.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DESCRIPTION OF THE PREFERRED EMBODIMENT

The power supply for an LED light source of the present invention provides power to a variable number of LEDs wired in series or in parallel. The power supply uses current feedback to adjust power to the LEDs and provides protection against open circuits and circuit malfunctions.

Figure 1:
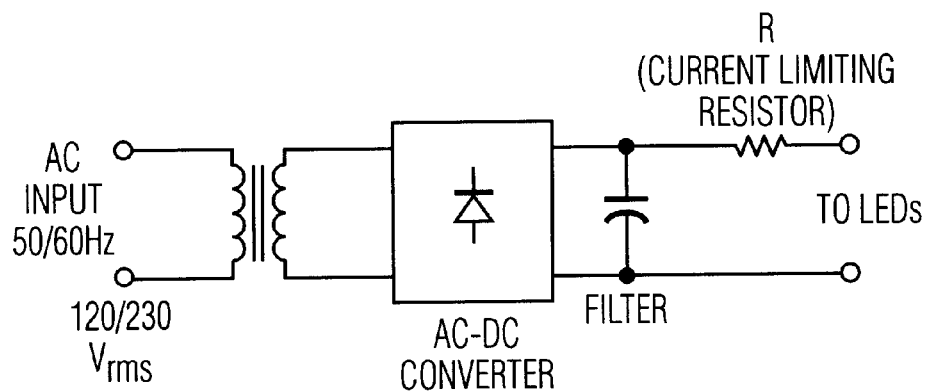
FIG. 1 shows a block diagram of an existing LED power supply.
Figure 2:
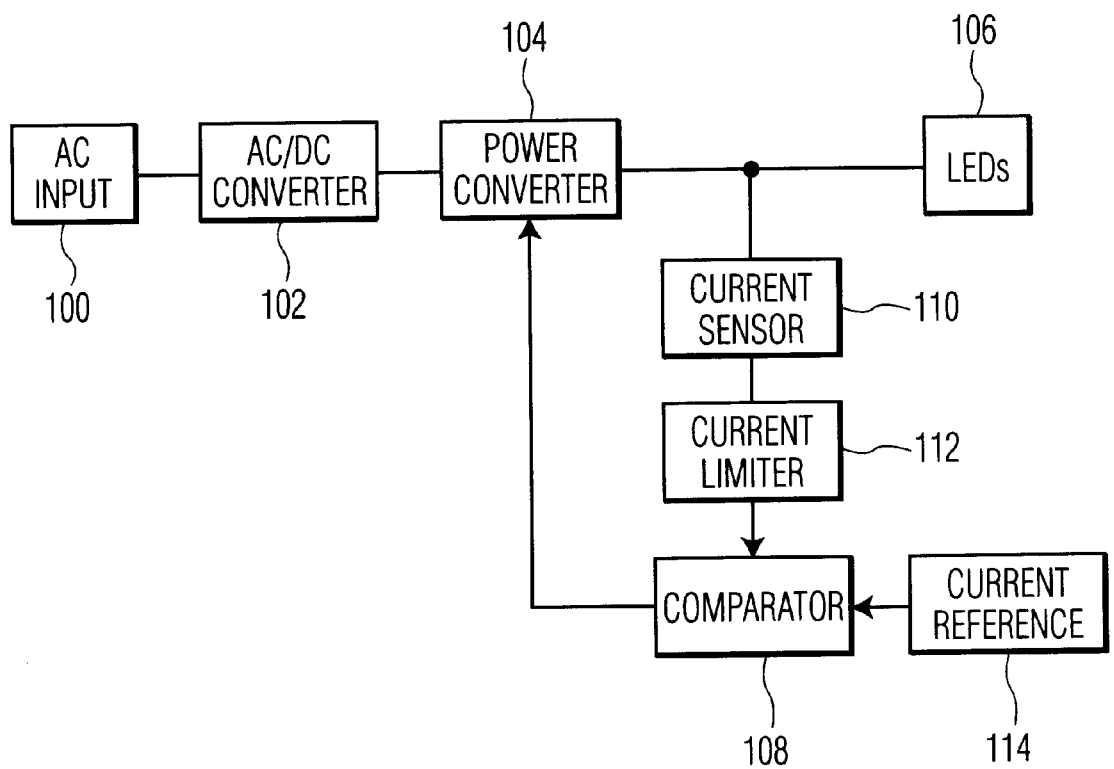
FIG. 2 shows a block diagram of a power supply for an LED light source made in accordance with the present invention.

FIG. 2 shows a block diagram of a power supply for an LED light source made in accordance with the present invention. Single-phase ac input is provided at block 100 and converted to dc by the AC/DC converter 102. Power converter 104 regulates the power to LEDs 106. The power converter 104 adjusts the power to the LEDs based on a feedback signal representing a current error generated at the comparator 108. Current sensor 110 measures the current flow to the LEDs 106 and provides a sensed current signal. In the embodiment illustrated in FIG. 2, a current limiter 112 limits the sensed current signal from the current sensor 110 and prevents too large a feedback signal to the power converter 104. In other embodiments, the current limiter 112 can be omitted, or can be installed between the comparator 108 and the power converter 104 to limit the feedback signal directly. The output of the current limiter 112 is compared to a reference current 114 at the comparator 108, which provides a feedback signal based on the difference between the current limiter output and the reference current 114. The feedback signal is input to the power converter 104.

Figure 3:
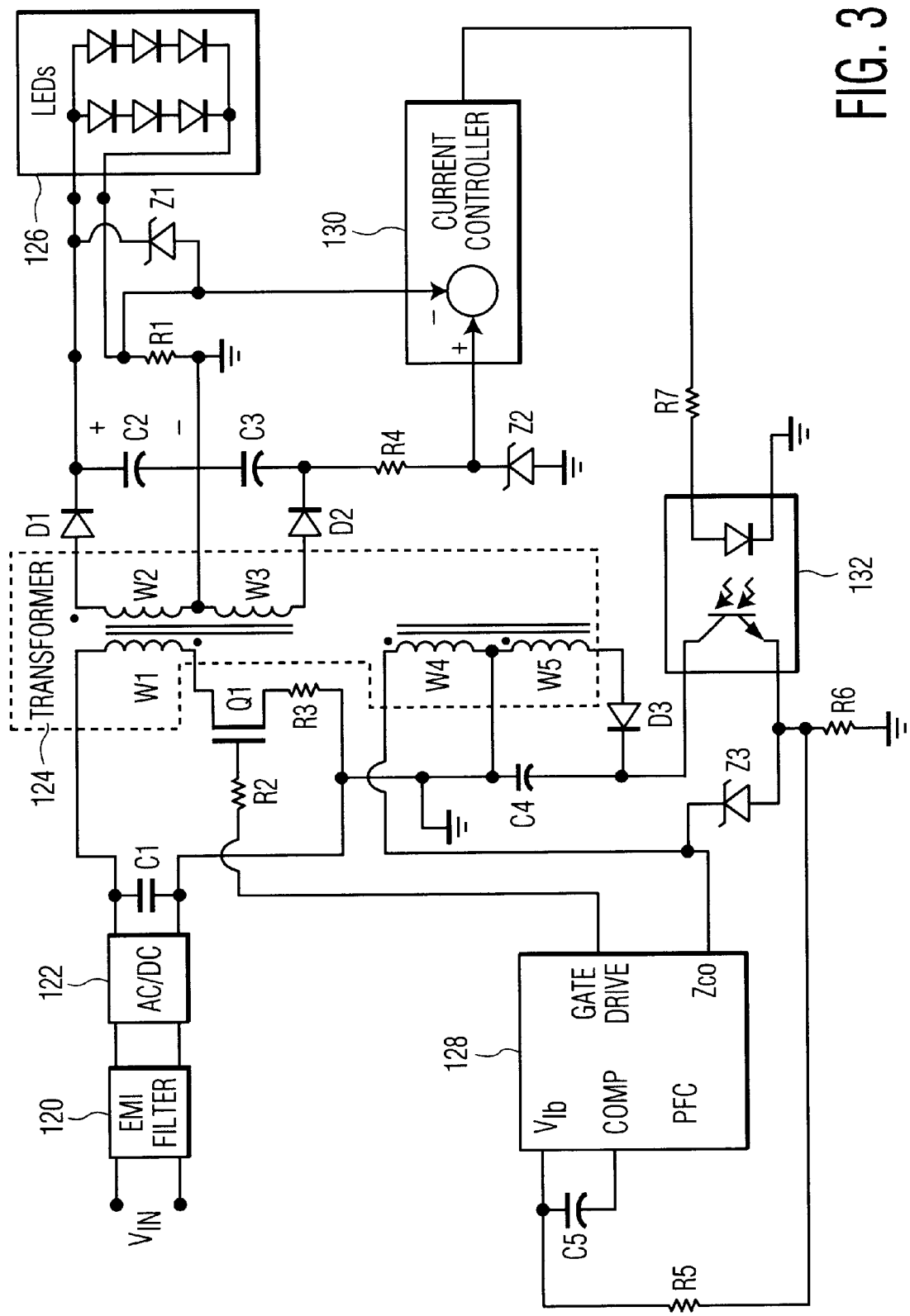
FIG. 3 shows a schematic diagram a power supply for an LED light source made in accordance with the present invention.

FIG. 3 shows a schematic diagram a power supply for an LED light source made in accordance with the present invention. The power supply uses a flyback transformer with current feedback through a power factor corrector to supply power to a variable number of LED light sources.

Voltage is supplied to the power supply at $V_{IN}$ to EMI filter 120. The voltage can be an ac input and is typically 50/60 Hertz at 120/230 $V_{RMS}$. The EMI filter 120 blocks electromagnetic interference on the input. AC/DC converter 122 can be a bridge rectifier and converts the ac output of the EMI filter 120 to dc. Transformer 124 comprises primary winding W1 and secondary windings W2, W3, W4, and W5. The windings W1/W2 constitute the flyback transformer to power the LEDs 126. The LEDs 126 can be white or colored LEDs, depending on the particular application, such as lighting or signage. The LEDs 126 can be a number of LEDs connected in series or parallel, or a combination of series and parallel circuits, as desired. The flyback transformer is controlled by PFC 128, which is a power factor corrector integrated circuit, such as model L6561 manufactured by ST Microelectronics, Inc. The flyback transformer with power factor corrector configuration has been widely used to provide isolated fixed voltage dc power sources with high line power factors.

The flyback converter controls the current to the LEDs 126 at a desired value. The forward converter operation of windings W1/W3 charge capacitor C3 and a reference current signal is generated between series resistor R4 and zener Z2. The peak voltage across capacitor C3 depends on the W1/W3 turns ratio. The output dc voltage from flyback operation of windings W1/W2 cannot be used to generate the reference current signal since the output dc voltage across LEDs 126 can have a wide range—from 2.6 Volts dc for one LED lamp to about 32 Volts dc for 8 LEDs in series. The forward converter operation of windings W1/W3 can be used instead. The forward converter operation of the W1/W3 and W1/W5 windings can also be used to supply power to the integrated circuits, such as PFC 128 and current controller 130.

A sensed current signal is generated across resistor R1, which is in series with the LEDs 126. The sensed current signal and reference current signal are compared at current controller 130. The current controller 130 can be a proportional type op-amp control circuit. The feedback signal from current controller 130 drives an optocoupler 132. The current controller 130 is necessary since optocouplers have a wide range of current transfer ratio (CTR). The current controller 130 maintains an accurate current feedback signal, thereby avoiding large errors in LED current. The optocoupler 132 isolates the dc circuit supplying the LEDs 126 from the ac circuit power supply at EMI filter 120, the two circuits being on the opposite sides of the transformer 124.

The output of the optocoupler 132 is connected to PFC 128, which supplies a gate drive signal to MOSFET Q1. MOSFET Q1 supplies a transformer control signal, adjusting the current flow through winding W1 of transformer 124 to match the LEDs 126 current demand until the sensed current signal and reference current signal are equal at current controller 130, so the feedback error signal goes to zero. The LED current demand is met, so no further action is required. The internal 2.5 V reference signal and an internal compensation circuit of PFC 128 maintain the voltage drop across resistor R6 at 2.5 V. Although this example uses MOSFET Q1 for adjusting the transformer current, alternate embodiments can use other types of transistors to adjust the current, such as an insulated gate bipolar transistor (IGBT) or a bipolar transistor. The input to PFC 128 at $Z_{CD}$ provides a reset signal powered from windings W1/W4.

Referring to FIG. 3, zener diode Z1 provides overvoltage protection for LEDs 126. The zener diode Z1 connects across the output connection to the LEDs 126 and clamps the output voltage to a specified maximum value. The nominal zener operating voltage is selected to be just over the maximum specified output voltage. In case of an output open circuit, the flyback operation of windings W1/W2 of transformer 124 would continue to build the output voltage. The increasing output voltage turns on the zener diode Z1, thereby increasing the sensed current signal, which in turn limits the feedback signal from current controller 130. This limits the gate drive signal to MOSFET Q1, preventing the flyback converter from building the output voltage to the LEDs 126 beyond a specified maximum voltage. Similarly, zener diode Z3 shown in FIG. 3 connected from the reset winding W4 to resistor R6 will prevent output overvoltage due to LED current control system malfunction. In alternate embodiments, either zener diode Z1 or zener diode Z3, or both zener diode Z1 and zener diode Z3, can be omitted depending on the degree of protection required for a particular application.

It is important to note that FIG. 3 illustrates specific applications and embodiments of the present invention, and is not intended to limit the scope of the present disclosure or claims to that which is presented therein. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A system for supplying power for LEDs comprising:
   means for sensing current to the LEDs, the current sensing means generating a sensed current signal;
   means for generating a reference current signal;
   means for comparing the sensed current signal to the reference current signal, the comparing means generating a feedback signal;
   means for converting power responsive to the feedback signal, the power converting means supplying current to the LEDs; and
   means for protecting the LEDs.

2. The system of claim 1 wherein the LED protecting means comprises means for limiting current to the LEDs.

3. The system of claim 2 wherein the current limiting means limits the sensed current signal.

4. The system of claim 2 wherein the current limiting means limits the feedback signal.

5. The system of claim 2 wherein the current limiting means is a zener diode circuit.

6. The system of claim 1 wherein the power converting means further comprises:
   a PFC responsive to the feedback signal, the PFC generating a gate drive signal;
   means for regulating a transformer responsive to the gate drive signal, the transformer regulating means generating a transformer control signal; and
   a flyback transformer responsive to the transformer control signal, the flyback transformer supplying current to the LEDs.

7. The system of claim 6 wherein the transformer regulating means is selected from the group consisting of a transistor, a MOSFET, an IGBT, and a bipolar transistor.

8. The system of claim 1 wherein the comparing means is a proportional type op-amp control circuit.

9. The system of claim 1 further comprising means for isolating the comparing means from the power converting means.

10. The system of claim 9 wherein the isolating means is an optocoupler.

11. The system of claim 1 wherein the reference current signal generating means is a forward converter transformer supplying a zener diode circuit.

12. A method of supplying power for LEDs comprising the steps of:

sensing current to the LEDs and generating a sensed current signal;

generating a reference current signal;

comparing the sensed current signal to the reference current signal;

generating a feedback signal based on the difference between the sensed current signal and the reference current signal;

converting power and supplying current to the LEDs in response to the feedback signal; and protecting the LEDs.

13. The method of claim 12 wherein the step of protecting the LEDs comprises the step of limiting current to the LEDs.

14. The method of claim 13 wherein the step of limiting current limits the sensed current signal.

15. The method of claim 13 wherein the step of limiting current limits the feedback signal.

16. The method of claim 13 wherein the step of limiting current limits current with a zener diode circuit.

17. The method of claim 12 wherein the step of converting power and supplying current to the LEDs further comprises the steps of:

generating a gate drive signal based on the feedback signal;

generating a transformer control signal based on the gate drive signal; and supplying current to the LEDs based on the transformer control signal.

18. The method of claim 12 wherein the step of comparing the sensed current signal to the reference current signal further comprises the step of comparing the sensed current signal to the reference current signal with a proportional type op-amp control circuit.

19. A circuit for supplying power for LEDs comprising:

a transformer, the transformer supplying current to the LEDs and being responsive to a transformer control signal;

a current sensor for sensing current to the LEDs, the current sensor generating a sensed current signal;

a current reference for generating a reference current signal;

a current controller for comparing the sensed current signal to the reference current signal, the current controller generating a feedback signal;

a PFC responsive to the feedback signal, the PFC generating a gate drive signal;

a transistor responsive to the gate drive signal, the transistor generating the transformer control signal; and a protective circuit limiting the current to the LEDs.

20. The circuit of claim 19 wherein the protective circuit comprises a current limiter for limiting the sensed current signal.

21. The circuit of claim 20 wherein the current limiter comprises a zener diode circuit.

22. The circuit of claim 19 wherein the protective circuit comprises a current limiter for limiting the feedback signal.

23. The circuit of claim 22 wherein the current limiter comprises a zener diode circuit.

24. The circuit of claim 19 wherein the protective circuit comprises a current limiter for limiting the transformer control signal.

25. The circuit of claim 24 wherein the current limiter comprises a zener diode circuit.

26. The circuit of claim 19 wherein the transistor is selected from the group consisting of a MOSFET, an IGBT, and a bipolar transistor.

27. The circuit of claim 19 wherein the current controller is a proportional type op-amp control circuit.

28. The circuit of claim 19 further comprising an optocoupler for isolating the current controller from the PFC.

29. The circuit of claim 19 wherein the transformer further comprises a flyback transformer and a forward transformer.

30. The circuit of claim 29 wherein the current reference generates the reference current signal using input from the forward transformer.

31. The circuit of claim 29 wherein the flyback transformer supplies current to the LEDs.

32. The system of claim 1 wherein the LED protecting means comprises means for limiting voltage to the LEDs.

33. The system of claim 32 wherein the voltage limiting means limits the sensed current signal.

34. The system of claim 32 wherein the voltage limiting means limits the feedback signal.

35. The method of claim 12 wherein the step of protecting the LEDs comprises the step of limiting voltage to the LEDs.

36. The method of claim 35 wherein the step of limiting voltage limits the sensed current signal.

37. The method of claim 35 wherein the step of limiting voltage limits the feedback signal.

38. A circuit for supplying power for LEDs comprising:

a transformer, the transformer supplying current to the LEDs and being responsive to a transformer control signal;

a current sensor for sensing current to the LEDs, the current sensor generating a sensed current signal;

a current reference for generating a reference current signal;

a current controller for comparing the sensed current signal to the reference current signal, the current controller generating a feedback signal;

a PFC responsive to the feedback signal, the PFC generating a gate drive signal;

a transistor responsive to the gate drive signal, the transistor generating the transformer control signal; and a protective circuit limiting the voltage to the LEDs.

39. The circuit of claim 38 wherein the protective circuit comprises a voltage limiter for limiting the sensed current signal.

40. The circuit of claim 38 wherein the protective circuit comprises a voltage limiter for limiting the feedback signal.

41. The circuit of claim 38 wherein the protective circuit comprises a voltage limiter for limiting the transformer control signal.

* * * * *